June 13, 1944.     F. M. McMILLAN     2,351,354
METHOD FOR EXECUTING CATALYZED VAPOR PHASE REACTIONS
Filed Nov. 27, 1939
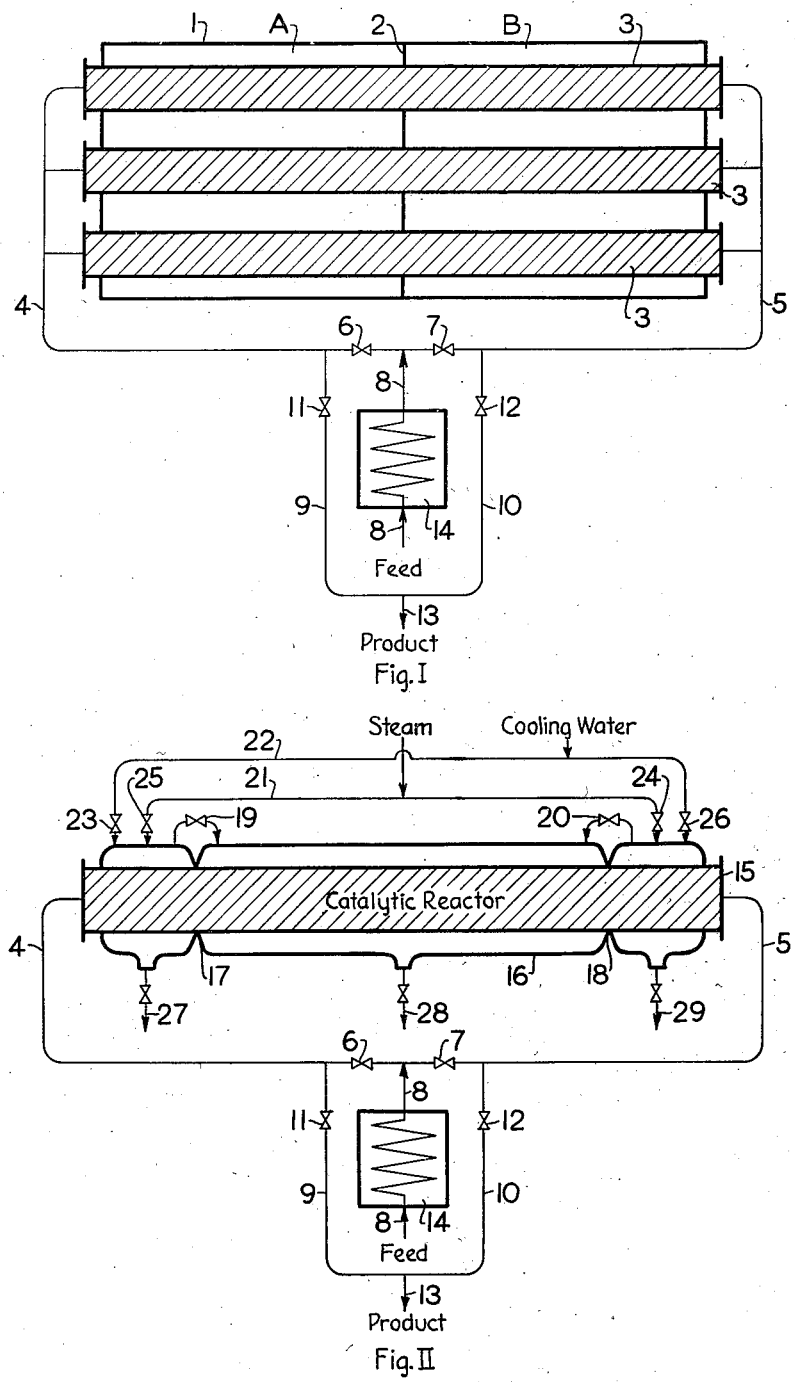
Fig. I
Fig. II
Inventor: Frank Matthew McMillan
By his Attorney:

Patented June 13, 1944

2,351,354

UNITED STATES PATENT OFFICE 2,351,354

METHOD FOR EXECUTING CATALYZED VAPOR PHASE REACTIONS

Frank Matthew McMillan, Berkeley, Calif., assignor to Shell Development Company, San Francisco, Calif., a corporation of Delaware Application November 27, 1939, Serial No. 306,281

1 Claim. (Cl. 260—683.5)

The present invention relates to an improved method for executing catalyzed vapor phase reactions. More particularly the invention relates to an improved method for executing vapor phase reactions at elevated temperatures with the aid of catalysts comprising an adsorptive alumina and aluminum chloride. Most particularly the invention relates to a method of treating hydrocarbon vapors at elevated temperatures in the presence of supported aluminum chloride catalysts.

As is well known, aluminum chloride possesses the ability to catalyze many reactions. It is a solid material having an appreciable vapor pressure at elevated temperatures; it sublimes at about 183° C. and melts at about 190° C. under 2.5 atmospheres pressure. When used as a catalyst in hydrocarbon reactions it is customary to suspend the aluminum chloride in a finely divided state in the liquid hydrocarbon to be treated. As the reaction proceeds, the aluminum chloride is gradually converted into a catalytically active liquid or semi-solid sludge consisting to a large extent of complex addition compounds between the aluminum chloride and certain hydrocarbons.

It has also been proposed to catalyze hydrocarbon reactions in the vapor phase with the aid of aluminum chloride vapors. In this method of operation the aluminum chloride is vaporized in a separate vaporizer and the vapors are passed into a reaction zone in contact with the vapors of the hydrocarbon to be treated. This method of operation is inefficient, expensive, beset with numerous practical difficulties and is of very little practical value.

It has also been proposed, in certain cases to support the aluminum chloride on one of the common catalyst carriers such as pumice, and to pass the hydrocarbon vapors thereover. This method has the big disadvantage of requiring the use of considerable pressures in order to minimize the loss of the aluminum chloride from the reaction zone by volatilization. Even when considerable pressures (for instance 10 atm.) are employed, an appreciable quantity of aluminum chloride is carried out of the reaction zone by the reactant vapors. This not only tends to deplete the catalyst of its active constituent in a very short time but also deposits aluminum chloride in various cooler parts of the plant and often leads to difficulties in recovering the desired reaction product.

I have discovered a very simple and advantageous means by which solid aluminum chloride may be employed to catalyze vapor phase hydrocarbon reactions at elevated temperatures while substantially avoiding depreciation of the catalyst due to loss of aluminum chloride and the other difficulties incident thereto.

According to the method of my invention, the aluminum chloride is supported upon or mixed with an adsorptive alumina. This catalyst and a portion of adsorptive alumina per se are charged to a catalytic reactor provided with means for maintaining a temperature gradient and means for reversing the direction of flow. During operation, the inlet end of the converter containing the aluminum chloride is maintained at a temperature appreciably higher than that of the exit end of the converter. The temperature gradient in the reactor and the direction of flow are periodically reversed. By operating in this manner aluminum chloride volatilized from the carrier in the hotter portion of the reactor is redeposited upon the carrier in the cooler portion of the reactor. By periodically reversing the flow of reactant vapors and reversing the temperature gradient in the reactor, the aluminum chloride is caused to migrate back and forth in the reactor without any appreciable amount leaving the system. In this way a given charge of catalyst may be employed for a much longer period of time without substantial loss in catalytic activity due to loss of aluminum chloride and the other disadvantages due to volatilization of the aluminum chloride are substantially avoided.

While the main advantages of the present method of operation are in preventing loss of aluminum chloride from the catalyst by volatilization, avoiding the deposition of aluminum chloride in various parts of the plant, and allowing the various processes to be more economically executed under lower pressures, I have found that the method affords still another unexpected advantage. In the treatment of hydrocarbon vapors in the presence of supported aluminum chloride catalysts, the catalyst loses its activity not only due to volatilization of the aluminum chloride but also due to the gradual deposition of carbon and tarry deposits upon the catalyst. In the present method of operation, this decline in the catalytic activity due to this latter cause is much less pronounced. This is believed to be due to the periodic redeposition of aluminum chloride upon the catalyst particles. Thus, in the present method of operation, aluminum chloride is being continually removed from below the deposited carbonaceous matter and redeposited on the top of said deposit. By the periodic cycle of volatilization and redeposition the burying of the aluminum chloride beneath deposits of tarry material is to a large extent prevented and the aluminum chloride is continually made available to catalyze the reaction.

Certain features and embodiments of the present method may be conveniently set forth in connection with the description of an operation comprised within the scope of the invention. To assist in the description the attached drawing is provided. Referring to Fig. I of the drawing, 1 represents a furnace of any suitable design divided into two sections, A and B, by a partition 2. The aluminum chloride and adsorptive alumina is contained in suitable reactor tubes 3, passing through sections A and B of the furnace. The catalytic reactors are connected at each end by manifolds 4 and 5 which, in turn, are provided with valves 6 and 7, and are connected between these valves to a common inlet pipe 8. Manifolds 4 and 5 are furthermore connected to leader pipes 9 and 10 provided with valves 11 and 12 which leader pipes are, in turn, connected to a common product outlet 13.

An operation cycle, employing a plant arranged according to this flow diagram, is as follows: valves 11 and 7 are closed and valves 6 and 12 are open. The sections of the converters 3 in section A of the furnace are maintained at the desired conversion temperature while section B of the furnace is held at an appreciably lower temperature. The material to be treated enters the system via inlet 8, passes through a preheater 14, and is led to the catalytic reactors via valve 6 and manifold 4. Most of the reaction takes place in those sections of the converters which are in section A of the furnace. As the reacting vapors pass through the converters in section A of the furnace, a portion of the catalyst is volatilized and carried with the vapors into the cooler sections of the converters in section B of the furnace wherein the vaporized catalyst is redeposited. The reacted vapors leave the converters via manifold 5, valve 12, pipe 10 and product line 13. After a desired proportion of the catalyst in those portions of the converters contained in the hotter, section A of the furnace has been removed and redeposited in those sections of the converters contained in the cooler, section B of the furnace, the procedure is reversed. Section B of the furnace is heated, section A of the furnace is allowed to cool, valves 6 and 12 are closed, and valves 11 and 7 are opened. The vapors to be treated then enter via 8, as before, and travel through the system via valve 7, manifold 5, converters 3, manifold 4, valve 11, line 9, and product line 13. During this part of the cycle the volatile catalyst is gradually removed from those sections of the converters that are in the hotter, section B of the furnace and is redeposited in these sections of the converters that are in the cooler, section A of the furnace.

While the described flow diagram illustrates a suitable and general application of my method of operation, many variations and modifications which may be more advantageous for particular cases, but which are still within the spirit of the invention, will be at once apparent. For example, when treating a normally gaseous reactant the separate preheater may, if desired, be eliminated and the preheating effected in the fore sections of the reactors. Also, for the sake of simplicity, manually operated valves are indicated. In practice it may be preferable to employ automatic valves actuated by suitable timing devices so that the periodic reversal of the flow and change in furnace temperatures may be fully automatic.

The present method of operation is especially advantageous for the isomerization of butane. For this process a steam-heated converter such as diagrammatically illustrated in Fig. II of the drawing may be advantageously employed. Referring to Fig. II, it is seen that the flow of reactant and product is the same as described for Fig. I except that a single reactor 15 is shown. The reactor 15 is surrounded by a jacket 16 which, in turn, is divided into three sections by two partitions 17 and 18. The three sections of the jacket are connected by valved by-passes 19 and 20. The end sections of the jacket are connected to a source of steam 21 and cooling water 22. When the butane is being introduced into the reactor via line 4, valves 23, 24 and by-pass 20 are closed, and valves 25 and 26 and by-pass 19 are open. With this arrangement the center section of the reactor is maintained at the desired temperature while the two end sections are alternately heated by steam and cooled by water according to the direction of flow through the reactor. The valved outlets 27, 28 and 29 are provided to remove condensate and cooling water from the jacket.

The hotter portion of the reactor is maintained at a suitable reaction temperature preferably not higher than the boiling point of the aluminum chloride under the prevailing pressure. The cooler portion of the reactor may be maintained at any lower temperature but should not be so low as to cause condensation of the reactant vapors. In the isomerization of butane and/or pentane using $AlCl_3$, for example, the hotter portion of the catalyst may be maintained up to as high as about 200° C. under pressures of from about one atmosphere up to several atmospheres, and the cooler portion of the catalyst may be cooled down to as low as 40–100° C., depending upon the prevailing pressure.

While, in general, the volatile catalyst may be supported upon or mixed with any of the common catalyst carriers such as pumice, porcelain chips, crushed brick, coke, chamotte and the like, I have found that exceptionally advantageous results may be obtained if the catalytic agent is supported upon or mixed with a carrier material such as adsorptive alumina. When employing adsorptive alumina in conjunction with the aluminum chloride, the present method utilizes not only the condensing action of the cooler portion of carrier but also its adsorptive action. Thus, for example, when employing aluminum chloride supported upon or mixed with adsorptive alumina for the isomerization of normal butane at temperatures of from 90 to 150° C. the reacted vapors, according to the present method, contain only traces of aluminum chloride. If pumice or other non-adsorptive carrier materials are employed in place of the adsorptive alumina in the same process, it is impossible to decrease the concentration of aluminum chloride in the reaction product to below that equivalent to saturation at the conditions prevailing at the exit end of the reaction chamber, and in order to reduce the concentration to that obtainable when using an adsorbent carrier, it is necessary to maintain the cooler portion of the catalyst at a much lower temperature.

According to another preferred embodiment of my invention, an adsorptive carrier material is used in the center of the reactor and the sections of the reactor near to the intake and exit are packed with a carrier material having a good heat conductivity. Thus, the aluminum chloride may be employed in a converter containing an adsorptive alumina capped at either end with a heat conducting carrier such as aluminum turnings or the like.

The application of the present method of operation in the isomerization of normal butane to isobutane and the advantageous results obtained thereby are illustrated by the following non-limiting example.

*Example*

The apparatus consisted of a tubular catalytic converter provided with suitable multiple heating means so that the temperatures of inlet and outlet sections could be separately regulated. The converter was connected to a butane preheater and a product line as shown in the attached flow diagram. The catalytic converter was charged with 20 parts by weight of 8–10 mesh pumice and 3 parts by weight of adsorptive alumina. The catalyst consisted of 5 parts by weight of anhydrous aluminum chloride. Normal butane vapors containing 5 mol percent hydrogen chloride were passed through the converter at a reaction temperature of 135–140° C. and one atmosphere pressure. Every two hours the direction of flow was reversed and the opposite end of the reactor maintained at the reaction temperature. Near the beginning of the run the conversion to isobutane was about 45%. After 50 hours of continuous operation the conversion was still about 25% and less than 5% of the aluminum chloride applied was removed from the converter. By the application of pressure this amount of loss of aluminum chloride can be still further reduced and the life of the catalyst further prolonged. If the present method of operation is not applied and the butane passed through the converter in only one direction, on the other hand, the aluminum chloride is substantially removed from the reaction zone in only about 25 hours.

While I have described my invention in its preferred embodiments and have supplied flow diagrams and an example to illustrate its use, I do not desire that these should be construed as limiting my invention. I am aware that numerous variations and modifications within the spirit of my invention will be readily apparent to those skilled in the art. No limitation other than these imposed by the scope of the appended claim are, therefore, intended.

I claim as my invention:

A process for the continuous isomerization of butane in the vapor phase with a catalyst comprising an adsorptive alumina and an effective amount of aluminum chloride which comprises contacting butane entirely in the vapor phase under isomerization conditions first with a portion of said catalyst maintained at an elevated temperature below about 200° C. and then with a portion of said catalyst maintained at an elevated temperature lower than the first and not substantially above 100° C., periodically reversing the relative temperatures of said portions of catalyst and reversing the order of contact of the butane with the portions of catalyst to contact the portion of catalyst maintained at the higher temperature first.

FRANK MATTHEW McMILLAN.